(12) United States Patent
Yukie et al.

(10) Patent No.: US 7,644,018 B1
(45) Date of Patent: Jan. 5, 2010

(54) SYSTEM AND METHOD FOR PROVIDING PUBLICLY VENDED CONTENT VIA A WIRELESS NETWORK

(75) Inventors: Satoru Yukie, San Diego, CA (US); Gina C. Eubanks, Oceanside, CA (US); Ken Aoki, Tenafly, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1517 days.

(21) Appl. No.: 09/542,139

(22) Filed: Apr. 4, 2000

Related U.S. Application Data

(60) Provisional application No. 60/181,129, filed on Feb. 8, 2000, provisional application No. 60/180,990, filed on Feb. 8, 2000, provisional application No. 60/180,987, filed on Feb. 8, 2000, provisional application No. 60/180,985, filed on Feb. 8, 2000, provisional application No. 60/181,148, filed on Feb. 8, 2000, provisional application No. 60/181,144, filed on Feb. 8, 2000, provisional application No. 60/181,145, filed on Feb. 8, 2000, provisional application No. 60/180,992, filed on Feb. 8, 2000, provisional application No. 60/180,991, filed on Feb. 8, 2000, provisional application No. 60/181,105, filed on Feb. 8, 2000, provisional application No. 60/181,128, filed on Feb. 8, 2000, provisional application No. 60/180,988, filed on Feb. 8, 2000, provisional application No. 60/181,147, filed on Feb. 8, 2000, provisional application No. 60/181,127, filed on Feb. 8, 2000, provisional application No. 60/180,984, filed on Feb. 8, 2000, provisional application No. 60/180,993, filed on Feb. 8, 2000.

(51) Int. Cl.
*G06Q 40/00* (2006.01)
(52) U.S. Cl. .......................................... 705/34; 705/35

(58) Field of Classification Search .............. 705/10–44
See application file for complete search history.

(56) References Cited

U.S. PATENT DOCUMENTS 5,128,755 A  7/1992  Fancher (Continued)

FOREIGN PATENT DOCUMENTS

| EP | 0 798 655 A | 10/1997 |
|---|---|---|
| EP | 0 878 759 A | 11/1998 |
| EP | 0 917 052 A | 5/1999 |
| EP | 0 948 160 A | 10/1999 |
| WO | WO 97 41654 A | 11/1997 |
| WO | WO 98 45717 A | 10/1998 |
| WO | WO 99 18499 A | 4/1999 |
| WO | WO 99 48308 A | 9/1999 |

OTHER PUBLICATIONS

"Dynamic Icon Content" Research disclosure, Kenneth Mason Publications, Hampshire, GB. No. 298, Feb. 1, 1989, p. 99 XP000293031, ISSN: 0374-4353.
"Managing Devices With The Web" Howard M. et al. Byte, McGraw-Hill Inc. St. Peterborough, US. vol. 22, No. 9, pp. 45-46, XP000726362 ISSN: 0360-5280, Sep. 1, 1997.

*Primary Examiner*—Frantzy Poinvil
(74) *Attorney, Agent, or Firm*—John L. Rogitz

(57) ABSTRACT

A system and method for vending digitized content over an Internet network path, at least a portion of which is wireless, such as an SDMA high data rate directional wireless path. Content in the form of IP packets is provided to a user terminal via a connect server in response to user requests, which can be real-time requests or which can be requests embodied in a user-defined or system-defined user profile. The user is billed using one or more of several billing paradigms, including by the content piece, by the number of IP packets sent to the user, by the length of time the user accesses the system, by the subscription, and so on.

22 Claims, 1 Drawing Sheet

U.S. PATENT DOCUMENTS

| | | | | |
|---|---|---|---|---|
| 5,617,526 A | | 4/1997 | Oran et al. | 345/779 |
| 5,634,012 A | * | 5/1997 | Stefik et al. | 705/39 |
| 5,642,353 A | * | 6/1997 | Roy et al. | 370/329 |
| 5,708,961 A | * | 1/1998 | Hylton et al. | 725/81 |
| 5,754,939 A | * | 5/1998 | Herz et al. | 455/3.04 |
| 5,799,285 A | * | 8/1998 | Klingman | 705/26 |
| 5,813,007 A | | 9/1998 | Nielsen | 707/1 |
| 5,874,965 A | | 2/1999 | Takai et al. | 345/357 |
| 5,917,488 A | | 6/1999 | Anderson et al. | 345/838 |
| 5,949,876 A | | 9/1999 | Ginter et al. | 380/4 |
| 6,006,227 A | | 12/1999 | Gelernter et al. | 707/7 |
| 6,020,884 A | | 2/2000 | MacNaughton et al. | 345/747 |
| 6,020,916 A | | 2/2000 | Gerszberg et al. | |
| 6,128,601 A | * | 10/2000 | Van Horne et al. | 705/34 |
| 6,141,339 A | | 10/2000 | Kaplan et al. | 370/352 |
| 6,233,682 B1 | * | 5/2001 | Fritsch | 713/168 |
| 6,243,089 B1 | | 6/2001 | Gong | 345/744 |
| 6,286,039 B1 | * | 9/2001 | Van Horne et al. | 709/221 |
| 6,288,716 B1 | | 9/2001 | Humpleman et al. | 345/733 |
| 6,313,855 B1 | | 11/2001 | Shuping et al. | 345/738 |
| 6,326,957 B1 | | 12/2001 | Nathan et al. | 345/173 |
| 6,369,840 B1 | | 4/2002 | Barnett et al. | 345/751 |
| 6,381,316 B2 | * | 4/2002 | Joyce et al. | 379/114.2 |
| 6,519,606 B2 | * | 2/2003 | Burton et al. | 707/102 |

* cited by examiner

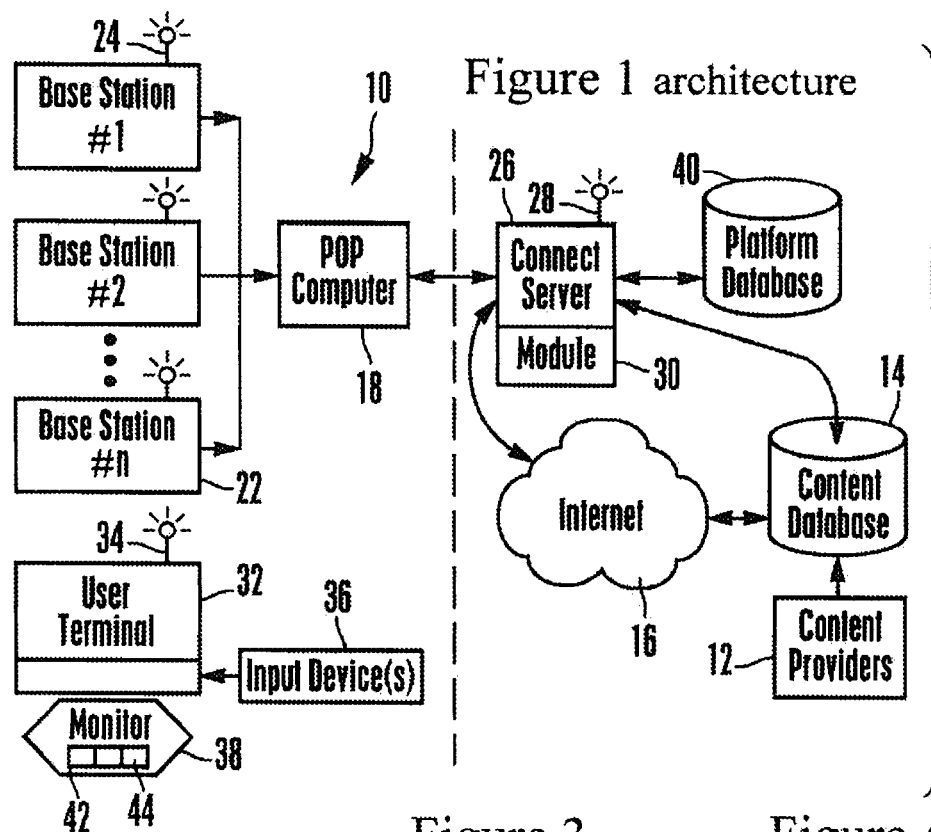
Figure 1 architecture
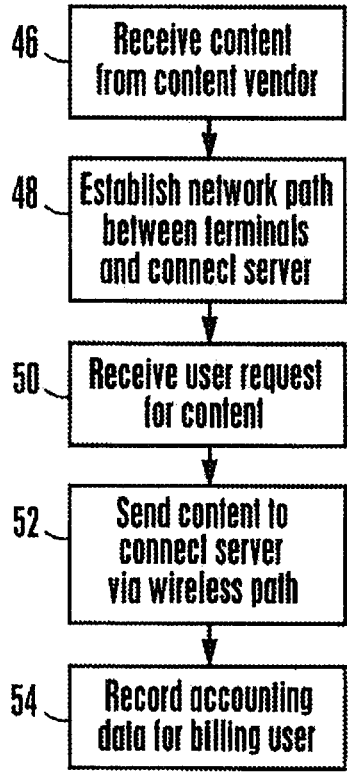
Figure 2 network logic
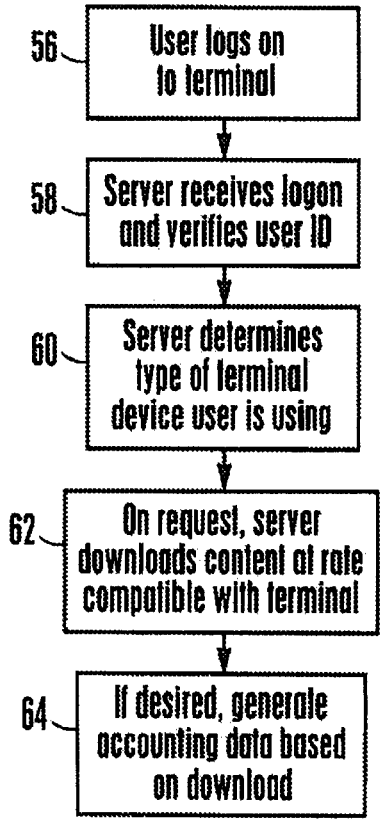
Figure 3 platform logic
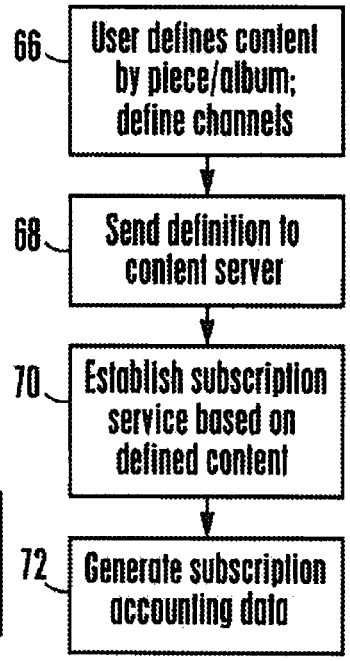
Figure 4 subscription logic

SYSTEM AND METHOD FOR PROVIDING PUBLICLY VENDED CONTENT VIA A WIRELESS NETWORK

RELATED APPLICATIONS

This application claims priority from the following U.S. provisional applications, all filed Feb. 8, 2000: Ser. Nos. 60/181,129, 60/180,990, 60/180,987, 60/180,985, 60/181,148, 60/181,144, 60/181,145, 60/180,992, 60/180,991, 60/181,105, 60/181,128, 60/180,988, 60/181,147, 60/181,127, 60/180,984, 60/180,993.

BACKGROUND OF THE INVENTION

1. Field of the Invention

The present invention relates generally to vending digitized content via wireless networks.

2. Description of the Related Art

Most digitized content such as music, videos, games, and the like currently is sold in disk or tape format at retail outlets or based on catalogue orders or online orders. A disk or tape player can then be used to play the content. Other content is televised over cable channels that can be subscribed to, with payment for the content being based on a subscription service. Broadcast content, that is, wireless content, typically is not billed to the user, since use of the content by the user cannot be established. Such broadcast content consequently is subsidized by advertisers.

Accordingly, to buy publicly vended content, a user can purchase the content on a disk, which requires the user either to order the content and then wait for delivery or travel to a retail outlet. This is time consuming and consequently reduces the sales volume that content providers might otherwise achieve. Alternatively, the user can establish a subscription account for cable delivery, but this requires the installation of hardwired infrastructure, and it precludes the use of mobile, wireless devices.

The present invention, in critically observing the above-noted considerations relating to current models of vending content, has made further critical observations to develop the network-based, wireless content provision paradigm disclosed herein. Specifically, the present invention understands that personal computing devices such as personal digital assistants (PDAs) and the like have become ubiquitous. Along with this, instant worldwide computer communication has become available via the Internet. This juxtaposition of technologies has spawned thousands of new computer-driven opportunities to serve both consumers and content providers.

The present invention still further recognizes that unfortunately, in many cases Internet network data transfer rates are relatively low. Most personal computers, for example, currently have Internet data transfer rates of less than 100 kbps, making the vending of certain types of data, such as video, less than satisfactory over the Internet. Moreover, personal computers typically are connected to the Internet via telephone lines or fiber optic lines, meaning that the computers cannot be transported while connected to the Internet. Further, since the computers must be connected to hard-wired lines, cumbersome and costly line installation is required.

In the case of most wireless network paths, the data rates are relatively slow, and moreover the network paths are not continuous. That is, to establish a wireless network path, a user has had to dial up the wireless network and establish a connection through a telephony switch. This renders impractical applications that require continuous, high data rate, wireless network paths. The present invention recognizes the above-noted problems and provides the solutions disclosed herein, as well as various applications that take advantage of these solutions.

SUMMARY OF THE INVENTION

A general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a computer network path, at least a portion of which is wireless. A user terminal is in the path, and a connect server communicates with the user terminal, with the connect server receiving requests for content generated from the user terminal and accessing a database of publicly vended content to fulfill the requests. A billing module is accessible to the connect server for generating accounting data based on the provision of the content in the database to users. Preferably, a portion of the network path is a directional wireless path that has no telephony switches therein, and the content is provided to the user terminal over the network in IP packets.

In a preferred embodiment, the billing module generates accounting data based on each request received. Alternatively, at least some requests can be embodied in a content subscription, and the billing module generates accounting data based on the subscription. As set forth in greater detail below, the subscription is established at least in part by a user profile. Still further, the billing module can generate accounting data based on a number of packets delivered to the user terminal, and/or based on at least one time period, and/or based on a type of the user terminal.

In another aspect, a method for vending content includes rendering the content in a digitized format, and making the content available on a computer network. The method further includes establishing at least one network path between the network and a user terminal, at least a portion of which is wireless. The content is sent to the user terminal via the network path, and accounting data representative of the provision of content to the user terminal is generated.

In still another aspect, a computer program device includes a computer program storage device that is readable by a digital processing apparatus. A program is on the program storage device. The program includes instructions that can be executed by the digital processing apparatus. The instructions include computer readable code means for billing a user for the provision of digitized packetized audio or video content from the Internet via a wireless network path to a user terminal associated with the user.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram showing the system of the present invention;

FIG. 2 is a flow chart showing the network logic of the invention;

FIG. 3 is a flow chart showing the platform logic; and

FIG. 4 is a flow chart showing the subscription logic.

DETAILED DESCRIPTION OF THE PREFERRED EMBODIMENTS

Referring initially to FIG. 1, a system is shown, generally designated 10, for vending publicly available commercial content from multiple content providers 12, in addition to also providing customized data mentioned further below. By "public content" is meant publicly available data that can be sold, such as but not limited to prerecorded commercial music and other audio including recordings, dictation, news, audio derived from video or text. Content can also include, commercial video such as movies, broadcast television, closed circuit monitoring and other feeds from video input devices. Content can also include non-commercial (e.g., governmental) audio and video that is broadcast over channels that are accessible to the public, whether by subscription or not. Also, content can include publicly-broadcast audio and video broadcasts of live events such as sporting events, music concerts, political speeches, and so on. Still further, public content can include still images from a camera or selection from a video data stream, computer-generated art or graphics, as well as games, such as video games (e.g., console-based, handheld-based, desktop-based, etc.) for download on a single-use basis, time-basis, purchase basis, and so on.

In contrast, by "customized data sources" is meant sources that provide data as defined by the user or that are associated with the user, and not with the general public. For instance, one customized data source might be a home security camera or a video camera located in the user's child's playroom or day care center as defined (set up) by the user, while another customized data source might be the user's home telephone, either wired or wireless or both, and yet another customized data source might be a stock market feed with portions of its stock information compiled into customized user-defined portfolio, or a customized database, such as, for example, an electronic journal of the user's personal finances. Still other customized sources include storage, such as data supplied by the user (e.g., images, audio, or other data stored in files), data requested by the user (e.g., search results), data stored on a device accessible by the server (e.g., an answering machine, desktop computer, different server). Personal data can also be provided, including but not limited to addresses, identifications, verification information such as biometric data, government documents such as passport images or passport data to replace a lost passport, financial information, credit information (e.g., for authorized third party access), user settings for electronic devices (e.g., channel selections or display parameters for a television where the device is a remote control, or operation settings for an appliance such as a refrigerator or oven). Customized data can be provided through a network connection to the connect server 26, such as across the Internet or from another user terminal. Content can also be provided from a database within or otherwise accessible to the content server 26, where the content server is also the content provider.

In the architecture shown, public content from the content providers 12 is made available in a content database 14 for provision of the data in Internet Protocol (IP) packets, with the database 14 preferably being accessible via the Internet 16.

One or more point of presence (POP) network computers 18 controls plural base stations 22, with the base stations 22 being in hard-wired or wireless communication with their associated POP computer 18. A POP computer can be established by a network operation center (NOC) computer, an SMS computer, or equivalent. As shown in FIG. 1, each base station 22 has an associated communication component 24, schematically rendered in FIG. 1 as smart antennas.

FIG. 1 also shows a connect server 26 communicates with the POP computer 18 for receiving network information therefrom. The communication can be via hardwire, wireless, or the Internet. In the case of wireless communication the connect server 26 can have a communication component 28 that communicates with the POP computer 18 through one or more of the base stations 22. Also, the connect server 26 accesses the content database, either through direct hardwired or wireless connection or through the Internet 16.

The connect server 26 executes a software-implemented or hardware-implemented module 30 to undertake the novel logic set forth below to communicate with a user terminal 32. The connect server 26 can connect one user terminal to another across various connections including wireline network such as the Internet, wireless system, or through the POP computer 18. The user terminal 32 also has an associated communication component 34 that can communicate with the base stations 22 via a wireless network path and, hence, with the connect server 26. It is to be understood that while FIG. 1 shows one exemplary architecture, the functions of the connect server 26 can be integrated into the user terminal 32 or integrated into the POP computer 18. It is to be further understood that the communication components can be embedded in the respective computers or removable therefrom in the form of, e.g., PCMCIA cards. These components can be set to active, meaning that whenever the associated device is energized, the device communicates with the system 10.

In any case, in accordance with present principles, the communication components 24, 28, 34 can be standard modems, in which case the network paths between the POP 18 (via the base stations 22), connect server 26, and user terminal 32 can be standard copper wire or optical fiber Internet path. In a preferred embodiment, however, as mentioned above at least a portion of the network path between the user terminal 32 and one or more of the remaining system components is a wireless path, such that the user terminal 32 can be mobile and portable while nonetheless communicating with the system 10 to receive digitized content, packetized in accordance with Internet Protocol (IP) principles, from the content database 14. Thus, the preferred path between the user terminal 32 and the connect server 26 can be wireless.

The wireless path or paths can be implemented by the so-called iBurst™ or Ricochet™ communication systems, and more preferably can be implemented by a space division multiple access (SDMA) path as disclosed in, e.g., U.S. Pat. Nos. 5,515,378, 5,592,490, 5,642,353, 5,828,658, and 5,909,471 to ArrayComm, incorporated herein by reference, in which case one or more of the communication components 24, 28, 34 include appropriate interfaces for sending and receiving data in IP format. As set forth in the above-referenced patents, SDMA is essentially a directional version of time division multiple access (TDMA), which produces a very high rate of data transmission (i.e., in excess of one megabyte per second) as compared to other types of Internet communication protocols. Directional principles might also be applied to code division multiple access (CDMA) systems.

The terminal device 32 is a digital processing apparatus, such as a personal digital assistant made by Sony. Or, the terminal device 32 can be a personal computer made by International Business Machines Corporation (IBM) or Apple Computer, or the terminal device 32 may be any computer, including a laptop computer, a palmtop computer, a digital audio device, or any other appropriate digital appliance. Likewise, the POP computer 18 and the connect server 26 can be established by any of the above-named computing devices, and in addition can be established by larger computers, such as mainframe computers.

As shown in FIG. 1, the terminal device 32 is electrically connected to one or more input devices 36, e.g., a mouse and/or a keyboard and/or voice recognition device and/or Jog Dial™, which can be manipulated by a user of the system 10 as set forth further below to purchase content from the content database 14 for display on, e.g., an output device such as a monitor 38. Other output devices such as other computers, computer networks, audio speakers, printers, and so on can be used. In accordance with the below discussion, the connect server 26 accesses a platform database 40 that contains information on the user, including the below-described user profile, as well as information on the type of device that establishes the user terminal 32. Together, the connect server 26 and user terminal 32 can be thought of as establishing a platform, although a single connect server 26 might service multiple user terminals.

The flow charts herein illustrate the structure of the modules of the present invention as embodied in computer program software or in hardware. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the present logic may be established by a computer program that is executed by a processor within, e.g., the user terminal 32 or connect server 26 or POP computer 18 as a series of computer-executable instructions. In addition to residing on hard disk drives, these instructions may reside, for example, in RAM of the appropriate computer, or the instructions may be stored on a DASD array, magnetic tape, electronic read-only memory, or other appropriate data storage device. In an illustrative embodiment of the invention, the computer-executable instructions may be lines of compiled C++ compatible code.

As also shown in FIG. 1, a selector element 42 is provided. In the preferred embodiment the selector element 42 is a toolbar, although other graphical user interface (GUI) elements can be used, such as, for example, drop-down menus or text. Alternatively, an audio interface can be provided (e.g., selectable audio channels with audible indications for channel content and alerts).

As shown, the selector element 42 includes at least one and preferably plural source icons 44, with each icon 44 being associated with a respective data channel. Each channel can be defined by the user to receive a particular type of public content, such as video, audio, live broadcasts, games, and the above-mentioned customized data. In any case, the selector element 42 is presented on the monitor 38 so that a user can view the feeds as presented in the icons 44 and/or click on one or more of the icons 44 to enlarge or otherwise enhance the feed from the associated channel. An icon 44 can be established by a real-time feed of data from its associated source, or it can be static, or it can be established by a text display or audio display of data Referring now to FIG. 2, the logic of the connect server 26 can be seen.

Commencing at block 46, the server 26 receives public content from the content providers 12. Moving to block 48, a network communication path is established between the server 26 and user terminal 32. Then, at block 50 a user request for content is received as set forth in greater detail below. The content is sent to the user terminal 32 via a wireless path at block 52, and accounting data is recorded at block 54 for billing the user for the provision of the content.

FIG. 3 shows further details of the platform logic, i.e., the logic undertaken by the connect server 26/user terminal 32. Commencing at block 56, the user logs on to the system 10. This is preferably done automatically when the user energizes the user terminal 32. When the preferred SDMA system is used, no telephony switches need be used in the communication path. Preferably, the path includes a private, secure tunnel channel having plural threads, one for each content channel defined by the user. Logon can be accomplished using a handshaking protocol or a registration protocol, with a user ID being input by the user by means of the input device 36 or automatically by means of a removable card such as a PCMCIA card or Memory Stick™. Or, the user ID can be generated or confirmed through a biometric such as a fingerprint or by voice analysis.

At block 58, the connect server 26 receives the logon and verifies the user's identification and password if provided. When the user logs on, the server 26 correlates the user ID to the toolbar 42 and sends the toolbar 42 to the user terminal 32. Thus, the toolbar 42 is associated with a user, not necessarily with a particular network device, such that wherever the user logs on his or her own personalized toolbar is presented. The toolbar 42 is always displayed, although if desired the user can minimize the toolbar 42 and drag and drop the toolbar 42 on the display.

Moving to block 60, the connect server 26 determines the type of device the user is using as the terminal 32. On request including an explicit real-time request for content and/or according to a subscription established by a user-defined or platform-defined profile, at block 62 the connect server 26 accesses the requested content and sends the content to the terminal 32 at a rate compatible with the type of device being used as the terminal 32. Thus, a single user can access content using more than one type of device. Accounting data is then generated or collected at block 64.

This accounting data is generated based on one or more billing paradigms. For instance, billing for the above-described service can be accomplished by gathering accounting data either during the entire time a user is logged on, or on a monthly subscription basis, or on a piece basis as content is downloaded, i.e., the user can be billed for each song or video downloaded. Or, the user can be billed based on the number of IP packets sent to the user, i.e., by volume of content downloaded. Still further, when multiple channels are defined as set forth below, the user can be billed on a per-channel basis, and so on. Invoices are periodically sent to the user of the device 32 based on the accounting data.

FIG. 4 shows details of the subscription/profile logic. Commencing at block 66, the user defines a profile, or the system defines a profile, with the profile being stored in the platform database 40 and accessed by the connect server 26.

To store the profile in the database 40, at block 68 two-way communication can be established between the server 26 and terminal 32 and the profile transmitted to the server 26, or if one-way communication from the server to the terminal is available, then the profile is sent to a service provider and input into the database 40. If two-way communication is established, the user terminal 32 can send requests and commands to the server 26, such as a purchase request, a pause command, an answer phone command, a move camera command, etc.

In defining a profile, either the user or the system 10 or both can establish channels, with each channel being represented by a respective icon 44 on the toolbar 42. For instance, one channel might be for video, another for audio (such as a user-selected radio station), and another for user-selected sporting events. Also, channels can be provided for receiving the above-described customized data that is personal to the user.

Channels can further be indicated or labelled by number, or by user-defined labels, such as "jogging", "sleeping", "relaxation", and so on, with, e.g., relaxing music being provided over the "sleeping" channel and energizing music or news reports being provided over the "jogging" channel.

Moreover, the user profile can include times when the user wants each channel to be active. For instance, the user might define the "jogging" channel to be active from 12 P.M. to 2 P.M. The server 26 transmits the associated content at the time indicated in the user profile. Accordingly, content over plural channels might be sent simultaneously to the user, by means of, e.g., the above-described multi-threaded tunnel channel. Or, the user can explicitly request a particular channel or a particular piece of content apart from the user profile. If desired, a public channel can be provided over which all user terminals in the system 10 can receive, e.g., weather news.

While the discussion above focusses on user-defined profiles, it is to be understood that the server 26 can access a profile that is generic for whatever type of device the user is employing, as determined by the server at block 60 of FIG. 3. For example, if the terminal 32 is an audio-video system for a school, it might receive data on multiple predetermined channels according to a service contract between the school and the service provider.

Moreover, when the user defines the profile, the server 26 can access an expert system module to respond to the profile. For instance, the user might select "jazz" on channel 1, and the server 26 would then access its expert system to determine which content in the content database 14 (or which real-time publicly broadcast radio station) plays jazz. Jazz music would then be provided on channel 1 at whatever times the user might have specified in the profile. Moreover, the user profile can include alert monitoring instructions, including but not limited to what channel to monitor at what time, what types of events the server 26 should report, when and how to report the event, etc. For example, the user can specify to be alerted at a particular time by causing the terminal 32 to emit a beep when a user-selected sporting event is to start, so that the user can view the terminal 32. Likewise, a user can be alerted to events that occur attendant to customized data, such as when motion is sensed by an in-home security camera, or when a stock price in a user-customized portfolio reaches a predetermined threshold. The alerts can include audible signals, flashing icons 44, text or video messages, etc.

In any case, the user can select one or more of the channels defined above for immediate display or for display at the time scheduled. It is to be appreciated that the user can thus be billed not only based on a song-by-song or program-by-program basis, but on the basis of the subscription services that are essentially defined by the user profile. The subscription service based on the profile is established at block 70, and accounting data therefor is generated at block 72.

When content is provided to the terminal 32, the software of the terminal 32 receives the IP packets of the content, and the IP packets are sent to the software port corresponding to the associated icon 44 (i.e., corresponding with the associated channel). That is, when more than one content stream in being received, the packets of the various streams are separated from those of other streams and sent to the respective ports associated with the selected channels. The packets are processed in accordance with IP packet processing principles known in the art, and the processed data is then displayed on the monitor 38.

While the particular SYSTEM AND METHOD FOR PROVIDING PUBLICLY VENDED CONTENT VIA A WIRELESS NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
   a computer network path, at least a portion of which is wireless;
   at least one user terminal in the path;
   at least one connect server communicating with the user terminal, the connect server receiving requests for content generated from the user terminal, the connect server accessing a database of publicly vended content to fulfill the requests; and
   at least one billing module accessible to the connect server for generating accounting data based on at least one of: each request for content received, each piece of content delivered to the user terminal, a content subscription, a type of user terminal, and a number of IP packets delivered to the user terminal.

2. The computer system of claim 1, wherein at least a portion of the network path is a directional wireless path.

3. The computer system of claim 2, wherein the directional wireless path has no telephony switches therein.

4. The computer system of claim 1, wherein the content is provided to the user terminal over the network path in packets.

5. The computer system of claim 4, wherein the packets are in IP protocol format.

6. The computer system of claim 1, wherein the subscription is established at least in part by a user profile.

7. The computer system of claim 1, wherein the billing module generates accounting data based at least in part on at least one time period.

8. The computer system of claim 1, wherein the network path has a data transmission rate of at least one Mbps.

9. The computer system of claim 1, wherein the user terminal is established by a device type, the server detecting the device type and providing content according thereto.

10. A method for vending content, comprising the acts of:

rendering the content in a digitized format;

making the content available on a computer network;

establishing at least one network path between the network and a user terminal, at least a portion of the path being a private wireless path;

sending the content to the user terminal via the network path; and generating accounting data representative of the provision of content to the user terminal; wherein the accounting data is based on at least one of:

a number of packets delivered to the user terminal; and a type of the user terminal.

11. The method of claim 10, wherein the private wireless path is a directional path.

12. The method of claim 11, wherein the private wireless path is an SDMA path.

13. The method of claim 11, wherein the wireless path has no telephony switches therein.

14. The method of claim 11, wherein the content is provided to the user terminal over the network in packets.

15. The method of claim 14, wherein the packets are in IP protocol format.

16. The method of claim 11, wherein the accounting data is generated based at least in part on at least one time period.

17. The method of claim 10, wherein the network path has a data transmission rate of at least one Mbps.

18. The method of claim 10, wherein the user terminal is established by a device type, the device type dictating the content provided thereto.

19. A computer program device comprising:

a computer program storage device readable by a digital processing apparatus; and a program on the program storage device and including instructions executable by the digital processing apparatus, the program comprising:

computer readable code means for billing a user for the provision of digitized packetized audio or video content from the Internet via a wireless network path to a user terminal associated with the user, including at least one of:

means for receiving a request for a piece of content from the user, the means for billing generating accounting data based at least in part on the request;

means for generating accounting data based at least in part on a number of packets sent to the user via the path;

means for generating accounting data based at least in part on a content subscription for content;

and means for generating accounting data based at least in part on a type of user terminal;

wherein the means for billing generates accounting data based at least in part on a number of packets sent to the user via the path.

20. The computer program device of claim 19, wherein the subscription is based at least in part on a user profile.

21. The computer program device of claim 19, wherein the network path has a data transmission rate of at least one Mbps.

22. The computer program device of claim 19, further comprising computer readable code means for determining a user terminal device type, the device type dictating the content provided to the user terminal.

\* \* \* \* \*